(12) United States Patent
Shibui

(10) Patent No.: US 7,305,745 B2
(45) Date of Patent: Dec. 11, 2007

(54) METHOD AND DEVICE FOR CONTROLLING TOOL SELECTING OPERATION OF TURRET TOOL POST

(75) Inventor: Yutaka Shibui, Saku (JP)

(73) Assignee: Citizen Holdings Co., Ltd., Tokyo (JP)

( * ) Notice: Subject to any disclaimer, the term of this patent is extended or adjusted under 35 U.S.C. 154(b) by 463 days.

(21) Appl. No.: 10/525,040

(22) PCT Filed: Aug. 11, 2003

(86) PCT No.: PCT/JP03/10218

§ 371 (c)(1),
(2), (4) Date: Feb. 18, 2005

(87) PCT Pub. No.: WO2004/018150

PCT Pub. Date: Mar. 4, 2004

(65) Prior Publication Data

US 2005/0262976 A1  Dec. 1, 2005

(30) Foreign Application Priority Data

Aug. 20, 2002  (JP) ............................. 2002-239626

(51) Int. Cl.
*B23B 3/16* (2006.01)
*B23B 7/04* (2006.01)
(52) U.S. Cl. ..................... 29/40; 29/39; 29/48.5 A; 82/120; 74/813 C
(58) Field of Classification Search ............ 29/39, 29/40, 48.5 A, 48.5 R; 82/120, 121, 159; 74/813 C, 813 R
See application file for complete search history.

(56) References Cited

U.S. PATENT DOCUMENTS 4,422,352 A * 12/1983 Boffelli ................ 74/813 L (Continued)

FOREIGN PATENT DOCUMENTS

JP  51-6298 B1  2/1976

(Continued)

*Primary Examiner*—Monica Carter
*Assistant Examiner*—Eric A. Gates
(74) *Attorney, Agent, or Firm*—Finnegan, Henderson, Farabow, Garrett & Dunner, L.L.P.

(57) ABSTRACT

A method of optimizing the tool selecting operation of a turret according to the contents of a machining program in a turret tool rest allowing a rotating tool to be fitted thereto, including a step (101) for determining whether the rotating tool is contained in various types of tools fitted to the turret, a step (102) for, when the rotating tool is contained, selecting whether the phase of the rotating motion of the rotating tool fitted to the turret is adjusted to be identical in each time the rotating tool is disposed at an indexing position, a step (103) for, when the phase of the rotating motion of the rotating tool is adjusted to be identical, performing a "less than one rotation control" in which the cumulative sum of the turning indexing motion of the turret in a same turning direction is less than one rotation, and a step (104) for, when the rotating tool is not contained in the fitted tools or the adjustment of the phase of the rotating motion is not performed even if the rotating tool is contained in the fitted tools, performing a "shortcut rotating control" in which the turning indexing motion of the turret is equal to or less than half a rotation in any turning direction.

5 Claims, 7 Drawing Sheets

U.S. PATENT DOCUMENTS

| | | | |
|---|---|---|---|
| 5,067,371 A * | 11/1991 | Sauter et al. | 74/813 L |
| 5,339,504 A * | 8/1994 | Thumm et al. | 29/48.5 A |
| 5,632,075 A | 5/1997 | De Bernardi et al. | |
| 6,865,789 B2 * | 3/2005 | Katoh et al. | 29/40 |
| 7,039,992 B2 * | 5/2006 | Tokuma et al. | 29/27 C |
| 7,117,773 B2 * | 10/2006 | Katoh et al. | 82/121 |

FOREIGN PATENT DOCUMENTS

| | | |
|---|---|---|
| JP | 53-41873 A | 4/1978 |
| JP | 7-251352 A | 10/1995 |

* cited by examiner

METHOD AND DEVICE FOR CONTROLLING TOOL SELECTING OPERATION OF TURRET TOOL POST

TECHNICAL FIELD

The present invention relates to tool-selection technology for a machine tool and, more particularly, to a method for controlling a tool-selecting operation of a turret tool rest in which a rotating tool can be fitted to a certain tool-mount portion. Also, the present invention relates to a control device for carrying out such a tool-selecting-operation controlling method.

BACKGROUND ART

In recent years, in the field of machine tools, there is an increasing trend for a compound machine tool to be capable of carrying out various machining processes, such as turning, drilling, milling, etc., with a wide variety of tools, such as cutting tools, drills, milling cutters, etc., the tools being provided in tool rests in a changeable manner, in order to allow workpieces having various complex shapes to be automatically machined. Also, in a lathe, such as a numerically controlled (NC) lathe, configured as such a compound machine tool (hereinafter generally referred to as an automatic lathe), taking into consideration of reduction in machining time, various multi-function type automatic lathes have been proposed, in which one or more spindles and one or more tool rests, respectively operatable along control axes different from each other, are collectively mounted on a single lathe bed, so as to make it possible to perform different machining processes (e.g., outer-diameter turning and boring) simultaneously on a same workpiece, or to perform simultaneous machining processes on different workpieces.

As a tool rest installed in such a multi-function type automatic lathe, a turret tool rest has been well known. The turret tool rest includes a turret provided with a plurality of tool-mount portions at respective indexing angles in a circumferential direction, and turning tools, such as cutting tools, and rotating tools, such as milling cutters, can be selectively fitted to desired tool-mount portions of the turret. Such a turret tool rest is generally provided with an index-drive mechanism for driving the turret in a turning indexing motion (i.e., a tool selecting operation) and with a rotation-drive mechanism for driving the rotating tool in a rotating motion (i.e., a machining operation) independently of each other. However, the turret tool rest may have a mechanical configuration in which, due to the fact that rotating tool remains operatively connected to the suspended rotation-drive mechanism during the turning indexing motion of the turret, the rotating tool rotates, in a passive manner, in accordance with the turning indexing motion. Also, in this mechanical configuration, the relationship between the rotation speed of the turret and the rotation speed of the rotating tool often may not represent an integer multiple relative to each other, depending on the ratio of rotation speed in a gear train provided between the rotating tool and the rotation-drive mechanism.

A rotating tool, such as a hob for gear cutting or a polygon cutter for polygon machining, which executes a cutting process while rotating a workpiece at a predetermined speed, can be fitted to the above-described turret tool rest. In this connection, in the case where the turret tool rest has such a mechanical configuration that the relationship between the rotation speed of the turret and the rotation speed of the rotating tool represents a non-integer multiple as described above, if the turret is turned by one rotation (360°) or more as a result of accumulation of turning indexing motions in the same direction during a procedure that a rotating tool finishes a cutting process on one workpiece at an indexed position and is thereafter disposed again at the indexed position for the same cutting process on the next other workpiece, the positional deviation of the edge of the rotating tool (i.e., the phase shift in the rotating motion) occurs during the two-time location of the tool at the indexed position. As a result, in the workpieces subjected to the cutting process by a hob or a polygon cutter, the position (or the coordinate) of the cut portion (e.g., a tooth of a gear or a lateral face of a polygon bar) of each workpiece upon completion of the cutting process may be differently located, for a two-time cutting process. If a positional deviation occurs, for every cutting process, in the cut portion of a workpiece upon completion of the cutting process, problems may arise wherein, when a secondary machining process, such as a milling process, is performed after the cutting process, a machined position (or a coordinate) on the workpiece may be shifted relative to the former cut portion (e.g., the tooth of the gear or the lateral face of the polygon bar), and thereby an intended product may not be obtained.

In order to eliminate the above problems, a countermeasure has been proposed wherein, when various tools used in a machining program of a workpiece are fitted to a turret tool rest, the tools are arranged in the order of machining steps in a normal rotating direction (e.g., in a clockwise direction) of the turret, and after the machining program is completed for one workpiece, a tool selecting operation is controlled so as to turn the turret in a reverse rotating direction for the selection of the first tool as a preparatory step for the next machining program. According to this measure, the turret does not turn by one rotation or more as the cumulative sum of the turning indexing motions in the same direction. In this measure, however, if a plurality of machining steps using the same tool are contained in the machining program, it is necessary to turn the turret in the reverse rotating direction even halfway in the machining process, under the prerequisite such that the cumulative sum of the turning indexing motions of the turret should not be one rotation or more. As a result, the machining program becomes complicated and may increase a load on an operator. In addition, even if the positional correlation between a currently selected tool being currently used and a next designated tool to be subsequently used is such that the next designated tool can be selected by a shortcut rotation of 180° or less by turning the turret in the normal rotating direction, there may arise a case wherein it is necessary to perform a roundabout rotation of more than 180° by turning the turret in the reverse rotating direction. Thus, the cycle time of the machining program may be unnecessarily increased.

DISCLOSURE OF THE INVENTION

It is an object of the present invention to provide a method, for controlling a tool selecting operation in a turret tool rest in which a rotating tool can be fitted to a certain tool-mount portion, which is capable of optimizing the tool selecting operation of the turret according to the contents of the machining program, such as the types of tools fitted to the turret or the provision of a secondary machining step after a cutting step using a rotating tool, and which is thereby capable of avoiding the complication of a machining program to reduce a load on an operator as well as to effectively prevent an unnecessary increase of the cycle time.

It is another object of the present invention to provide a control device for carrying out the tool selecting operation controlling method, as described above, in a machine tool.

In order to accomplish the above objects, the present invention provides a method for controlling a tool selecting operation in a turret tool rest including a turret provided with a plurality of tool-mount portions at respective indexing angles in a circumferential direction, in which a rotating tool fitted to a certain tool-mount portion rotates in a passive manner in accordance with a turning indexing motion of the turret, the method comprising selecting whether a phase of a rotating notion of the rotating tool, fitted to the tool-mount portion of the turret, is adjusted to be identical in each time the rotating tool is disposed at an indexed position; causing the turret to perform a turning indexing motion, when it is selected that the phase of the rotating motion of the rotating tool is adjusted to be identical, in such a manner that a cumulative sum of the turning indexing motion of the turret in a same turning direction is less than one rotation; and causing the turret to perform a turning indexing motion, when it is selected that the phase of the rotating motion of the rotating tool is not adjusted to be identical, in such a manner that an individual turning indexing motion of the turret is at most half a rotation in any turning direction.

In the method as described above, wherein the plurality of tool-mount portions are respectively assigned tool numbers in ascending order along a certain turning direction, in a case where the turret is caused to perform the turning indexing motion while ensuring the less than one rotation, a turning direction may be determined by comparing a tool number of the tool-mount portion for a currently selected tool as being currently used with a tool number of the tool-mount portion for a next designated tool as to be subsequently used, among all of the tools fitted to the turret.

The above method can be advantageously applied to the case where the rotating tool comprises a hob.

Also, the above method can be advantageously applied to the case where the rotating tool comprises a polygon cutter.

Furthermore, the present invention provides a control device for carrying out a method for controlling a tool selecting operation as set force in claim 1, the control device comprising an input section for allowing an instruction regarding whether the phase of the rotating motion of the rotating tool is matched with a specified phase at an instant when the rotating tool fitted to the certain tool-mount portion of the turret is disposed at the indexed position by the turning indexing motion of the turret; a drive control section for controlling the turning indexing motion of the turret; and a processing section for causing the drive control section to control the turning indexing motion in such a manner that, when it is instructed through the input section that the phase of the rotating motion of the rotating tool is matched, the cumulative sum of the turning indexing motion of the turret in the same turning direction becomes less than one rotation, and for causing the drive control section to control the turning indexing motion in such a manner that, when it is instructed through the input section that the phase of the rotating motion of the rotating tool is not matched, the individual turning indexing motion of the turret is at most half a rotation in any turning direction.

BRIEF DESCRIPTION OF THE DRAWINGS

The above and other objects, features and advantages of the present invention will become more apparent from the following description of preferred embodiments in connection with the accompanying drawings, in which.

BEST MODES FOR CARRYING OUT THE INVENTION

Figure 1:
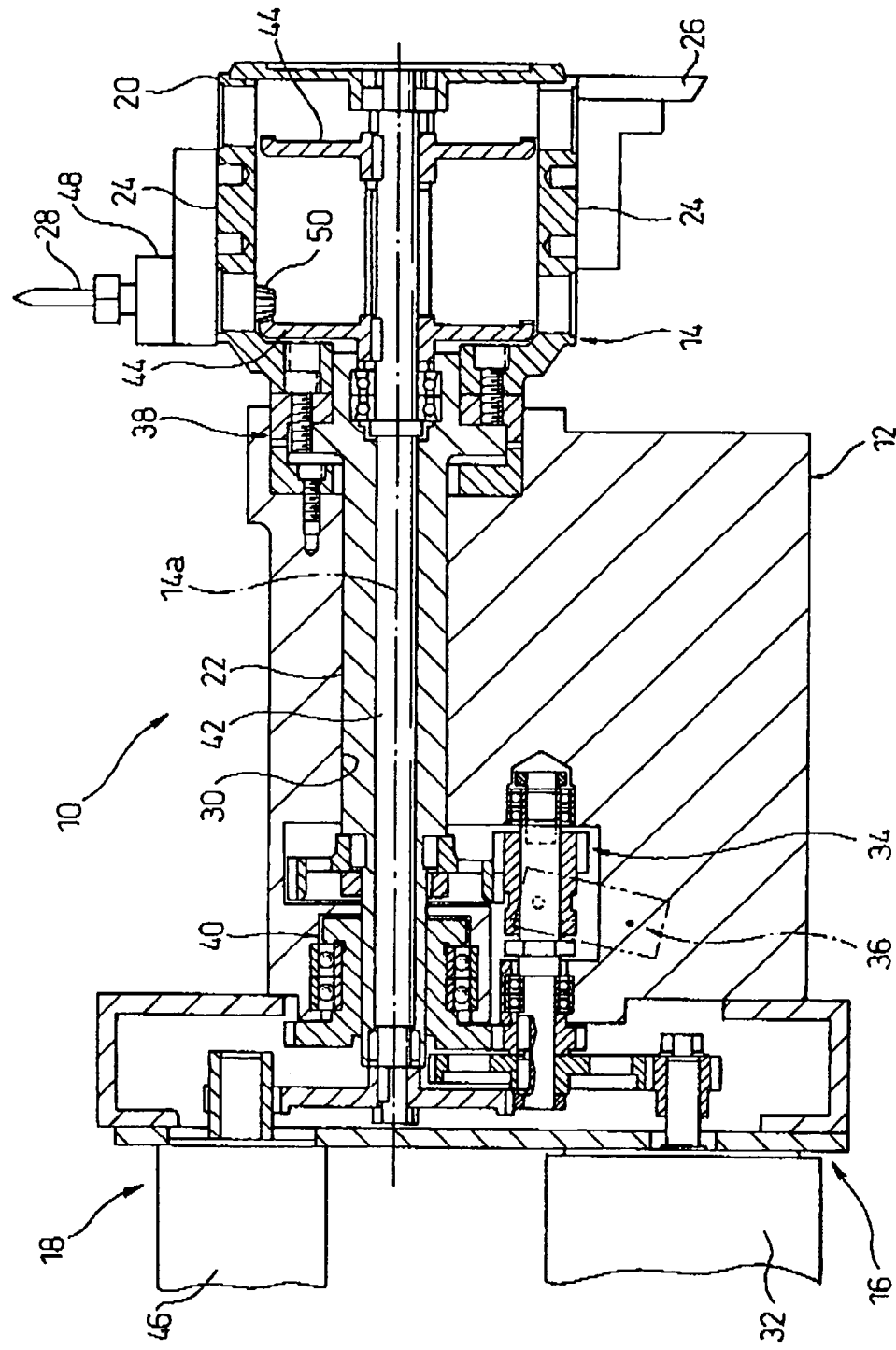
FIG. 1 is a sectional view showing the exemplary configuration of a turret tool rest to which a method for controlling a tool selecting operation, according to the present invention, is applicable.

The embodiments of the present invention are described below, in detail, with reference to the accompanying drawings. In the drawings, the same or similar components are denoted by common reference numerals.

Referring to the drawings, FIG. 1 shows the configuration of a turret tool rest 10 capable of conveniently carrying out a method for controlling a tool selecting operation according to the present invention. The turret tool rest 10 has a configuration capable of being installed on an automatic lathe such as a NC lathe. The turret tool rest 10 includes a tool-rest body 12, a turret 14 supported turnably on the tool-rest body 12, an index-drive mechanism 16 for driving the turret 14 in a turning indexing motion (i.e., a tool selecting operation) about a turning axis 14a, and a rotation-drive mechanism 18 for driving a rotating tool, as described later, fitted to the turret 14 in a rotating motion (i.e., in a machining operation).

The turret 14 includes a hollow head 20 having a cylindrical or prism-like outer shape and a hollow cylindrical shaft 22 extending coaxially from one axial end of the head 20 in an axial direction. The head 20 of the turret 14 is disposed so as to project outward from the front end face (the right end, in the drawing) of the tool-rest body 12, and a plurality of tool-mount portions 24 are provided at respective predetermined indexing angles along the outer circumferential surface thereof for the fitting of the tools. A turning tool 26, such as a cutting tool, and a rotating tool 28, such as a drill or a milling cutter, can be selectively fitted to a tool-mount portion 24. The shaft 22 of the turret 14 is received rotatably and axially movably in a turret receiving cavity 30 penetratingly formed through the tool-rest body 12.

The index-drive mechanism 16 includes a servomotor 32 for turning the turret 14, a clutch unit 34 arranged between the turret 14 and the servomotor 32 for operatively and releasably connecting the turret 14 with the servomotor 32, a clutch drive unit 36 for actuating the clutch unit 34, an engaging unit 38 arranged between the tool-rest body 12 and the turret 14 for detachably engaging the turret 14 with the tool-rest body 12, and a power transmitting unit 40 arranged between the servomotor 32 and the engaging unit 38 for transmitting the output power of the servomotor 32 to the engaging unit 38 for the actuation of the engaging unit 38. In the index-drive mechanism 16, when the clutch unit 34 is located at an interconnecting position by the clutch drive unit 36, the torque of the servomotor 32 is transmitted, via the clutch unit 34, to the turret 14 and, at the same time acts, via the power transmitting unit 40, to shift the engaging unit 38 toward a disengaging position, and thereby the turret 14 operates in a turning motion. Also, when the clutch unit 34 is located at a released position by the clutch drive unit 36, the torque of the servomotor 32 is no longer transmitted to the turret 14, while the servomotor 32 acts, via the power transmitting unit 40, to shift the engaging unit 38 toward an engaging position, so that the turret 14 is securely held at an indexed position on the tool-rest body 12.

The rotation-drive mechanism 18 includes a drive shaft 42 penetrating through and received rotatably and axially movably in the shaft 22 of the turret 14, a drive gear 44 fixed to the drive shaft 42 within the head 20 of the turret 14, and a servomotor 46 for driving the drive shaft 42 in rotation. When the rotating tool 28 is fitted, using an exclusive holder 48, to the desired tool-mount portion 24 of the turret 14, a driven gear 50 interconnected to the rotating tool 28 is meshed with the drive gear 44 located inside the turret head 20, and the rotating tool 28 is thereby operatively connected via the drive shaft 42 with the output shaft of the servomotor 46. In this state, when the servomotor 46 operates, the rotating tool 28 is driven for rotation by a predetermined ratio of rotation speed. In the illustrated turret tool rest 10, a pair of drive gears 44 are provided to be axially spaced from each other in the turret head 20, so that the rotating tool 28 can be fitted to each tool-mount portion 24 at two locations different from each other in the axial direction.

In the turret tool rest 10 having the above configuration, the index-drive mechanism 16 of the turret 14 and the rotation-drive mechanism 18 of the rotating tool 28 are provided functionally independently of each other. However, during the turning indexing motion of the turret 14, the rotating tool 28 fitted to the desired tool-mount portion 24 remains operatively connected via the driven gear 50 to the suspended rotation-drive mechanism 18. Therefore, when the turret 14 operates for the turning indexing motion on the tool-rest body 12, the driven gear 50 of the rotating tool 28 rolls along the drive gear 44 in a stationary state relative to the tool-rest body 12 in accordance with the turning motion of the turret, and consequently, the rotating tool 28 rotates in a passive manner. In this mechanical configuration, the relationship between the rotation speed of the turret 14 and the rotation speed of the rotating tool 28 often may not represent an integer multiple relative to each other, depending on the gear ratio between the drive gear 44 of the rotation-drive mechanism 18 and the driven gear 50 of the rotating tool 28.

Figure 2A:
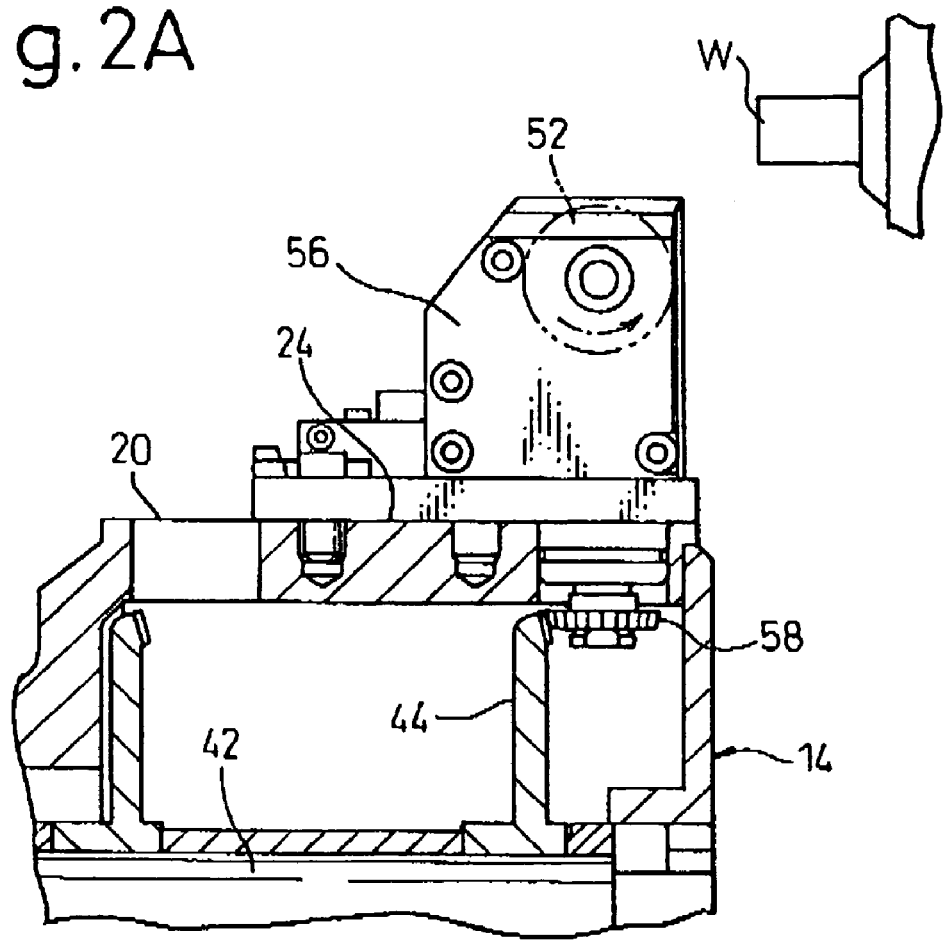
FIG. 2A is a partially cutaway side view showing a hob, as an example of a rotating tool, in a state where it is fitted to the turret tool rest of FIG. 1.
Figure 2B:
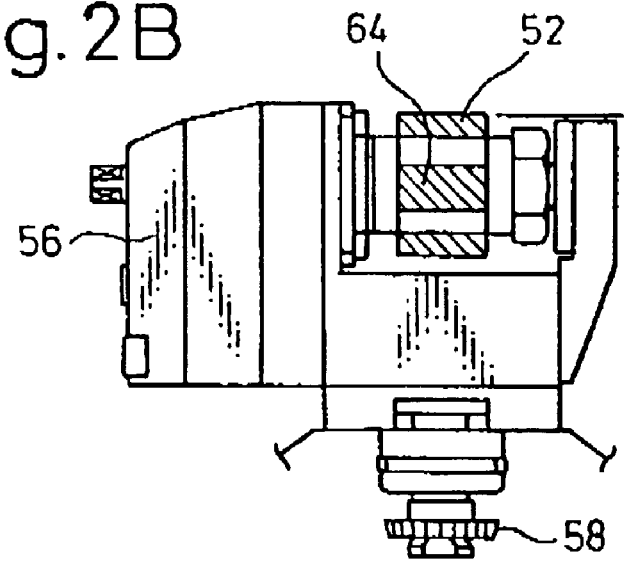
FIG. 2B is a partially cutaway front view showing the hob, corresponding to FIG. 2A.
Figure 3A:
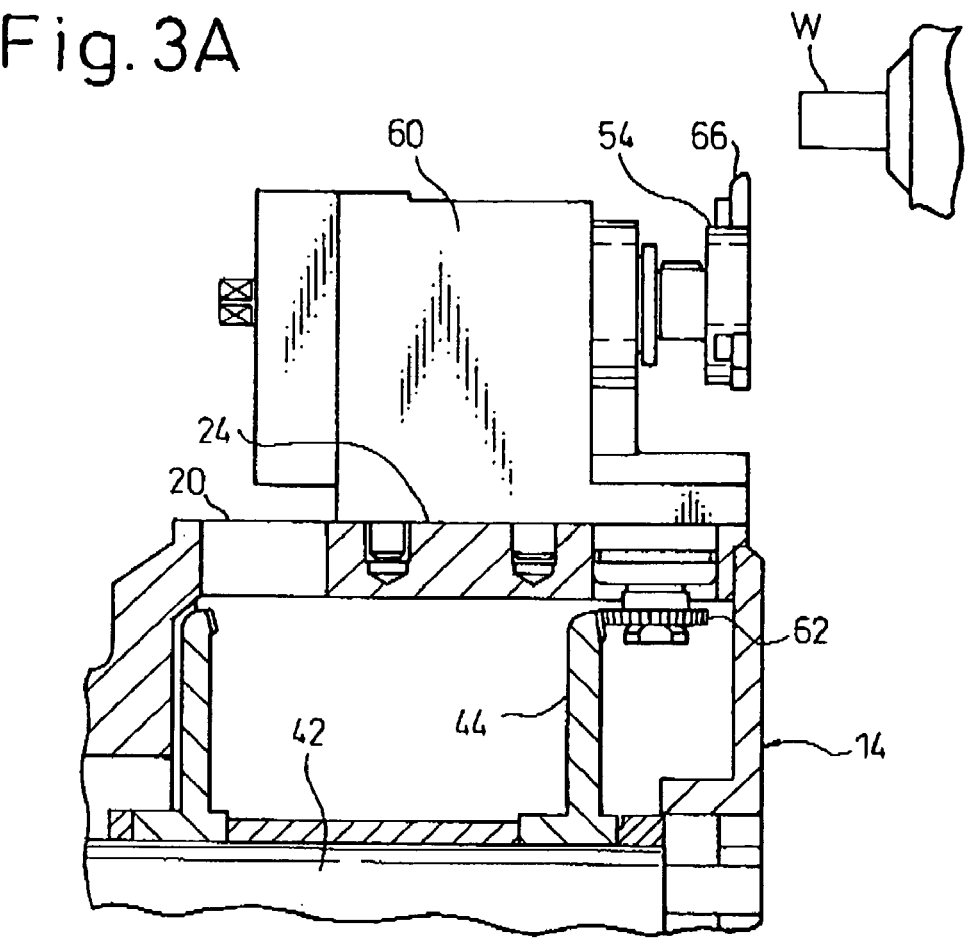
FIG. 3A is a partially cutaway side view showing a polygon cutter, as an example of a rotating tool, in a state where it is fitted to the turret tool rest of FIG. 1.
Figure 3B:
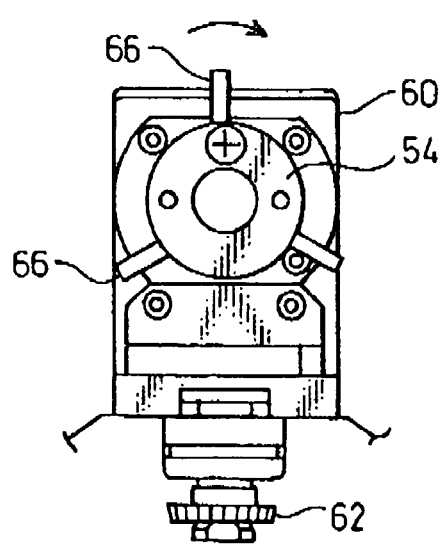
FIG. 3B is a partially cutaway front view showing the polygon cutter, corresponding to FIG. 3A.

A rotating tool, such as a hob 52 for gear cutting (FIG. 2A) or a polygon cutter 54 for polygon machining (FIG. 3A), which executes a cutting process while rotating a workpiece W at a predetermined speed, can be fitted to the turret tool rest 10. The hob 52 is fitted using an exclusive holder 56 to the desired tool-mount portion 24 of the turret 14, and a driven gear 58, connected to the hob 52 through a power transmitting unit (not shown) incorporated in the holder 56, is meshed with the drive gear 44 in the turret head 20. Similarly, the polygon cutter 54 is fitted using an exclusive holder 60 to the desired tool-mount portion 24 of the turret 14, and a driven gear 62, connected to the polygon cutter 54 through a power transmitting unit (not shown) incorporated in the holder 60, is meshed with the drive gear 44 in the turret head 20.

In the case where the hob 52 is fitted to the turret tool rest 10 and where the relationship between the rotation speed of the turning indexing motion of the turret 14 and the rotation speed of the passive rotation of the hob 52 represents a non-integer multiple depending on the gear ratio between the drive gear 44 and the driven gear 58, if the turret 14 is turned by one rotation (360°) or more as a result of accumulation of turning indexing motions in the same direction during a procedure that the hob 52 finishes the gear-cutting process on one workpiece at an indexed position and is thereafter disposed again at the indexed position for the same gear-cutting process on the next (other) workpiece, the positional deviation of the edge 64 of the hob 52 (i.e., the phase shift in the rotating motion) occurs during the two-time location of the hob at the indexed position. As a result, in the workpieces subjected to the gear-cutting process by the hob 52, the position (or the coordinate) of the teeth of a product (or a gear) upon completion of the gear-cutting process may be differently located, for a two-time gear-cutting process. If a positional deviation occurs, for every gear-cutting process, in the teeth of the product upon completion of the gear-cutting process, problems may arise wherein, when a secondary machining process, such as a milling process, is performed subsequent to the gear-cutting process, a machined position (or a coordinate) on the workpiece may be shifted relative to the teeth, and thereby an intended product may not be completed.

Similarly, in the case where the polygon cutter 54 is fitted to the turret tool rest 10 and where the relationship between the rotation speed of the turning indexing motion of the turret 14 and the rotation speed of the passive rotation of the polygon cutter 54 represents a non-integer multiple depending on the gear ratio between the drive gear 44 and the driven gear 62, if the turret 14 is turned by one rotation (360°) or more as a result of accumulation of turning indexing motions in the same direction during a procedure that the polygon cutter 54 finishes the polygon-machining process on one workpiece at an indexed position and is thereafter disposed again at the indexed position for the same polygon-machining process on the next (other) workpiece, the positional deviation of the edge 66 of the polygon cutter 54 (i.e., the phase shift in the rotating motion) occurs during the two-time location of the polygon cutter at the indexed position. As a result, in the workpieces subjected to the polygon-machining process by the polygon cutter 54, the position (or the coordinate) of the lateral faces of a product (or a polygon bar) upon completion of the polygon-machining process may be differently located, for a two-time polygon-machining process. If a positional deviation occurs, for every polygon-machining process, in the lateral faces of the product upon completion of the polygon-machining process, problems may arise wherein, when a secondary machining process, such as a milling process, is performed subsequent to the polygon-machining process, a machined position (or a coordinate) on the workpiece may be shifted relative to the lateral faces, and thereby an intended product may not be completed.

Figure 4:
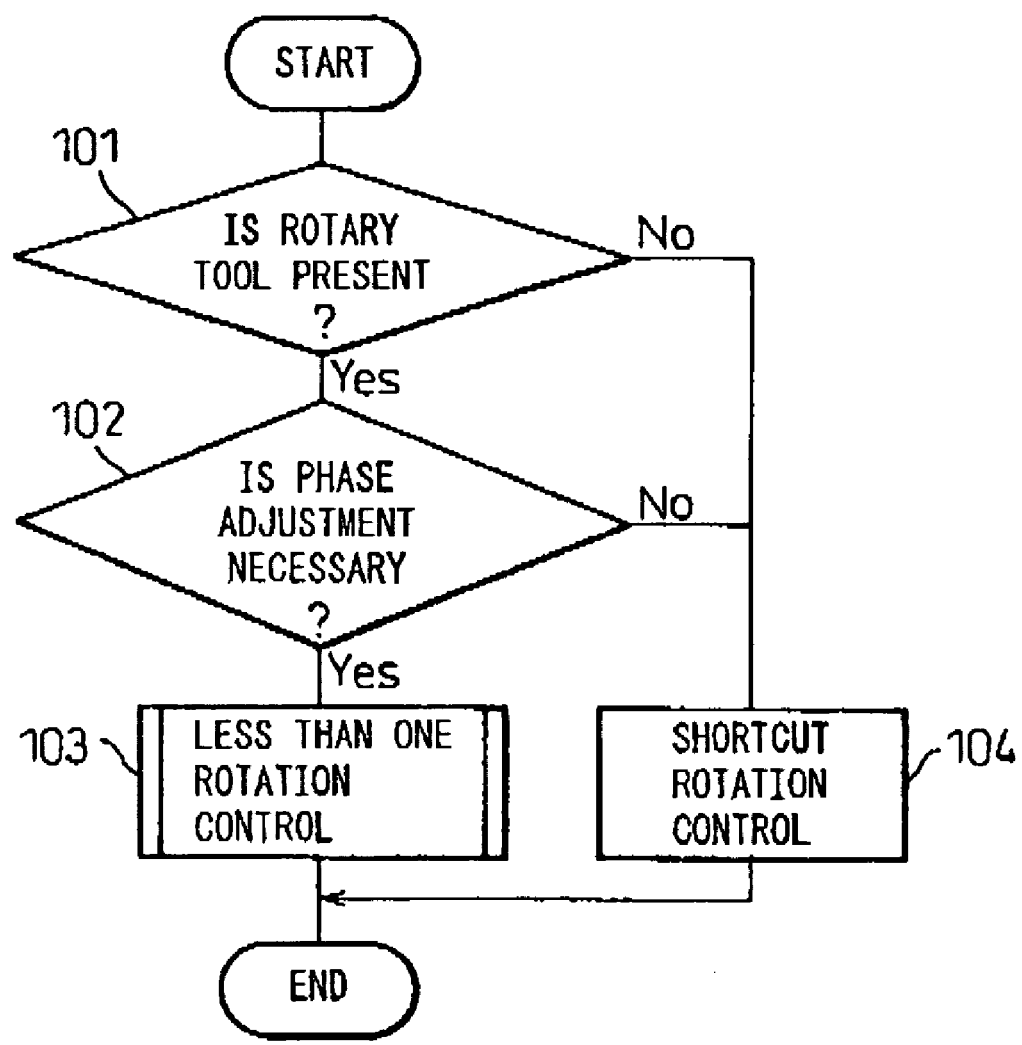
FIG. 4 is a flow chart showing a method for controlling a tool selecting operation, according to an embodiment of the present invention.

A method for controlling a tool selecting operation, according to an embodiment of the present invention, provided for eliminating the above problems, will be described below with reference to FIG. 4. Note that each processing step, as shown in the flow chart of FIG. 4, is to be performed basically by a processing section (CPU) of a control device as described later, which is incorporated into a machine tool such as an automatic lathe. The processing section of the control device can refer to data previously input through an input section of the control device by an operator, such as the data of type of tools fitted to the plural tool-mount portions 24 of the turret tool rest 10, or the data whether a phase adjusting operation as described later is necessary in the case where the rotating tool is included, etc., and can thereby carry out a required processing.

First, before starting a control for the tool selecting operation of the turret tool rest 10, the processing section of the control device judges whether a rotating tool (such as a drill 28, a hob 52, a polygon cutter 54, etc.) is included in various tools fitted to the plural tool-mount portions 24 of the turret 14 (Step 101). In this connection, if this judgment cannot be performed on the basis of the previously input data, step 101 is omitted. If it is judged that a rotating tool is included, selection is made at step 102, as to whether the phase of the rotating motion of the rotating tool 28, 52, 54, fitted to a certain tool-mount portion 24 of the turret 14, is adjusted to be identical in each time the rotating tool 52, 54 is disposed at an indexed position.

If it is selected that the phase of the rotating motion of the rotating tool 28, 52, 54 is adjusted to be identical, a "less than one rotation control" is performed in Step 103, in which the cumulative sum of the turning indexing motions of the turret 14 in the same turning direction becomes less than one rotation, and thus the turret 14 is caused to perform a tool selecting operation under the "less than one rotation control". On the other hand, if it is judged that a rotating tool is not included, and also if it is selected that the phase of the rotating motion of the included rotating tool is not adjusted to be identical, a "shortcut rotation control" is performed in Step 104, in which an individual turning indexing motion of the turret 14 is equal to or less than half a rotation in any turning direction, and thus the turret 14 is caused to perform a tool selecting operation under the "shortcut rotation control".

When performing the "less than one rotation control" in Step 103, the processing section of the control device takes into account the positional correlation between the currently selected tool being currently used and the next designated tool to be subsequently used, and thus causes the tool selecting operation of the turret 14 under the suitable selection of the turning direction to ensure that the cumulative sum of the turning indexing motions of the turret 14 in the same turning direction is always less than 360°. Therefore, in some cases, the individual turning indexing motion of the turret 14 may become a roundabout rotation exceeding 180°. On the other hand, when performing the "shortcut rotation control" in Step 104, the processing section of the control device causes the tool selecting operation of the turret 14 under the suitable selection of the turning direction for ensuring that, irrespective of the positional correlation between the currently selected tool and the next designated tool, the individual turning indexing motion of the turret 14 is always a shortcut rotation at most 180°. Therefore, in some cases, the cumulative sum of the turning indexing motions of the turret 14 in the same turning direction may become one rotation or more.

Thus, in the tool selecting operation controlling method as described above, it is possible for an operator to intentionally select and designate either one of two types of tool selecting operations of the turret 14. The processing section of the control device thus suitably selects the turning direction of the turret 14 for the tool selecting operation on the basis of the designation of the operator. Therefore, according to the tool selecting operation controlling method as described above, it becomes unnecessary to designate the turret turning direction in addition to a tool designation in a machining program, and thereby the machining program is simplified and a load on an operator is reduced. Also, it is possible to optimize the tool selecting operation of the turret 14 in accordance with the contents of the machining program, such as the type of tools fitted to the turret 14 or the provision of a secondary machining process after a cutting process using a rotating tool, etc., so that unnecessary increase in the cycle time of the machining program is effectively prevented.

In the tool selecting operation controlling method as described above, when the processing section of the control device selects the turning direction of the turret 14, it is advantageous that tool numbers are assigned to the plural tool-mount portions 26 of the turret 14 in ascending order along a certain turning direction, and that a control system (e.g., an NC) capable of designating a selected tool by indicating the tool number is employed. As an exemplary procedure for selecting a turning direction of the turret 14 by using such a control system, a turning direction selecting procedure in "less than one rotation control" will be described below with reference to FIGS. 5 and 6.

Figure 5:
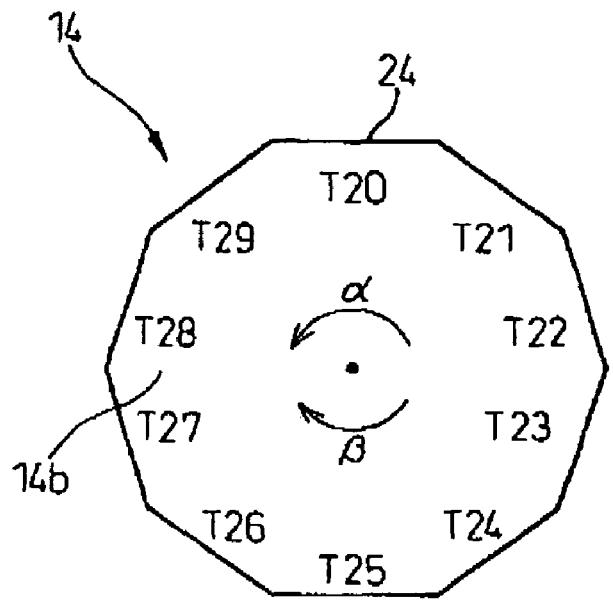
FIG. 5 is a view showing an example of a turret, to which the tool selecting operation controlling method of FIG. 4 is applied.
Figure 6:
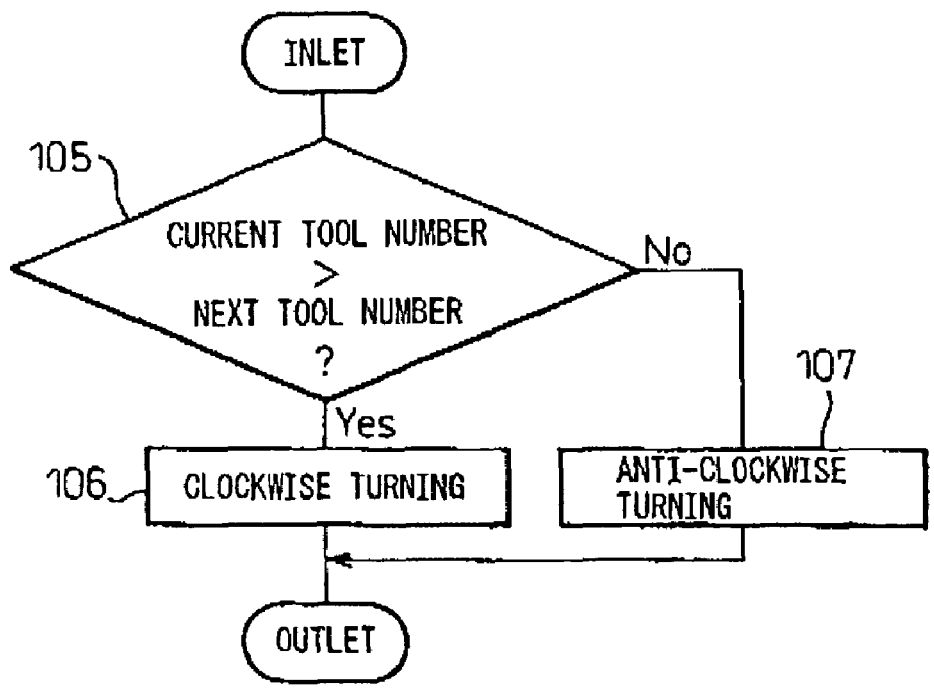
FIG. 6 is a flow chart showing the processing steps of a "less than one rotation control" in the tool selecting operation controlling method of FIG. 4.

As shown in FIG. 5, tool numbers T20 to T29 are assigned to the plural tool-mount portions 24 of the turret 14, so as to be arranged in ascending order in a clockwise direction on the illustrated axial front-end face (the right-end face, in FIG. 1) 14b thereof. In the case where a "less than one rotation control" is performed for the turret tool rest 10, the processing section of the control device first compares the tool number of the tool-mount portion 24 for a currently selected tool being used for machining with the tool number of the tool-mount portion 24 for a next designated tool to be subsequently used, among all of the tools fitted to the turret 14, and judges which is the greater (Step 105). If it is judged that the tool number of the currently selected tool is greater than the tool number of the next designated tool, the turret 14 is turned in a clockwise direction β as illustrated (i.e., in a direction as decreasing the tool numbers) (Step 106). On the other hand, if it is judged that the tool number of the currently selected tool is smaller than the tool number of the next designated tool, the turret 14 is turned in an anticlockwise direction a as illustrated (i.e., in a direction as increasing the tool numbers) (Step 107). According to this turning direction selecting procedure, the cumulative sum of the turning indexing motion in the same turning direction of the turret 14 becomes always less than 360°.

Figure 7:
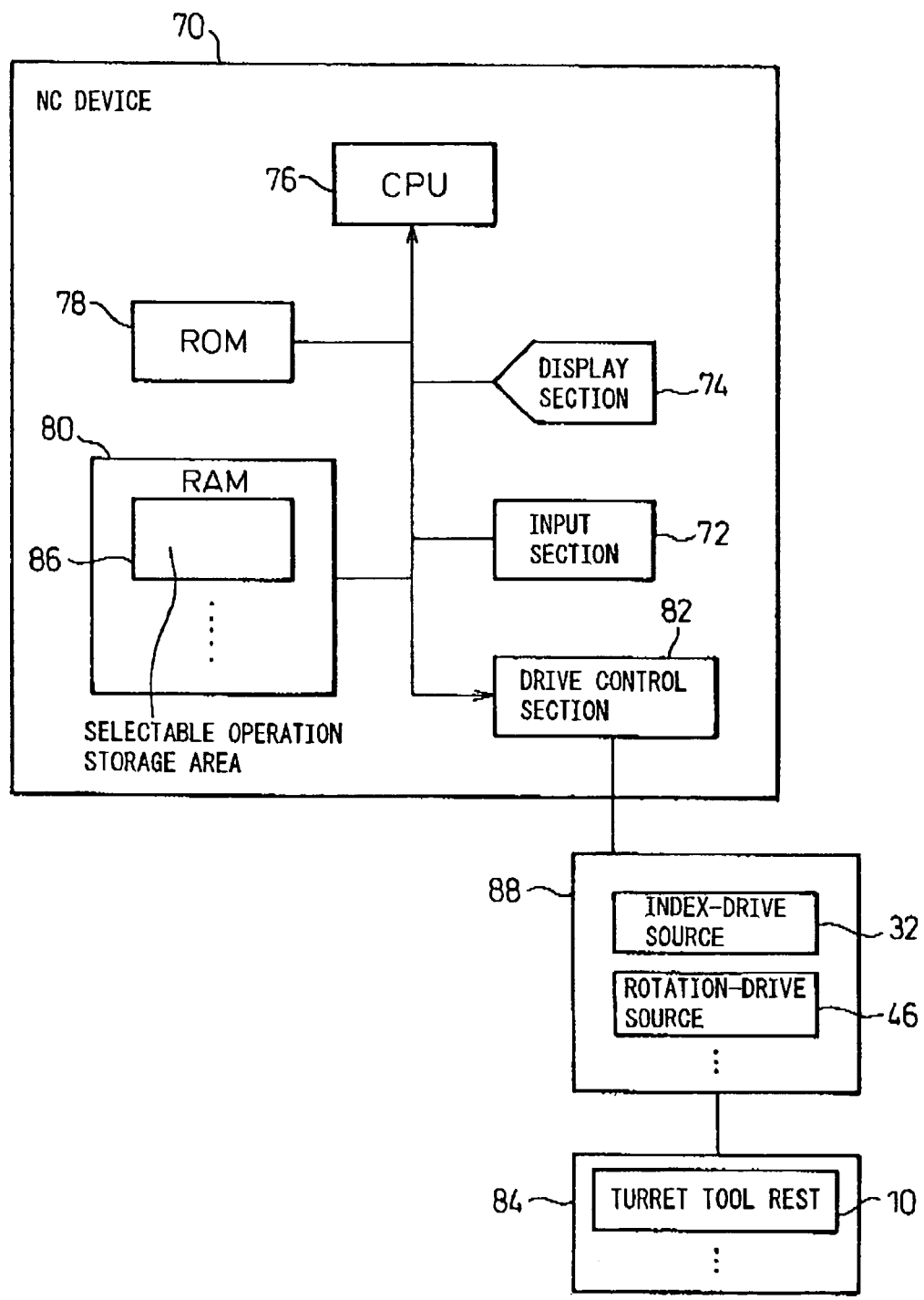
FIG. 7 is a block diagram showing the configuration of a control device according to an embodiment of the present invention, capable of carrying out the tool selecting operation controlling method of FIG. 4.

The configuration of a control device, according to an embodiment of the present invention, will be described below with reference to FIG. 7, which is provided for carrying out, in a machine tool, the tool selecting operation controlling method as described above. Although this control device has, by way of example, the configuration of a NC device 70 installed in a numerically controlled (NC) lathe, the present invention is not limited to this, and a control device other than the NC device may also be used.

The NC device 70 includes an input section 72, a display section 74, a processing section (CPU) 76, a storage section (ROM 78 and RAM 80) and a drive control section 82. The input section 72 is provided with, e.g., a keyboard including numerical keys (not shown). Data (such as tool selection, shape and dimension of product, rotation speed of spindle, feed speed of tool, etc.) required to control the operations of various tool rests and spindles, such as the turret tool rest 10, provided in the NC lathe (hereinafter generally referred to as movable structures 84), as well as machining programs (i.e., block sequences) including these data in connection with the respective tools, are input through the input section 72. The display section 74 is provided with a display unit (not shown), such as a CRT (cathode ray tube), a LCD (liquid crystal display) or the like, and acts to permit the data and/or the machining programs input through the input section 32 to be displayed on the display unit, and to enable automatic programming, accompanying simulation, to be accomplished interactively on the display unit.

A control program for driving the movable structures 84 is previously stored in ROM 78 of the storage section. RAM 80 is provided with storage areas for storing various data relating to a tool selecting operation control function, such as a selectable operation storage area 86 and the like. In addition, data relating to the plural tools and the machining programs containing these data, which are input through the input section 72, are stored in ROM 78 or RAM 80 in accordance with the instruction from CPU 76. CPU 76 outputs an operation command to the drive control section 82 on the basis of various data and machining programs stored in ROM 78 or RAM 80 as well as the control program stored in ROM 78. The drive control section 82 controls various drive mechanisms 88 including the index-drive source (or the servomotor) 32 and the rotation-drive source (or the servomotor) 46 of the turret tool rest 10 respectively in accordance with the operation command from CPU 76, so as to make the drive mechanisms respectively actuate various movable structures 84 provided on the NC lathe.

Figure 8:
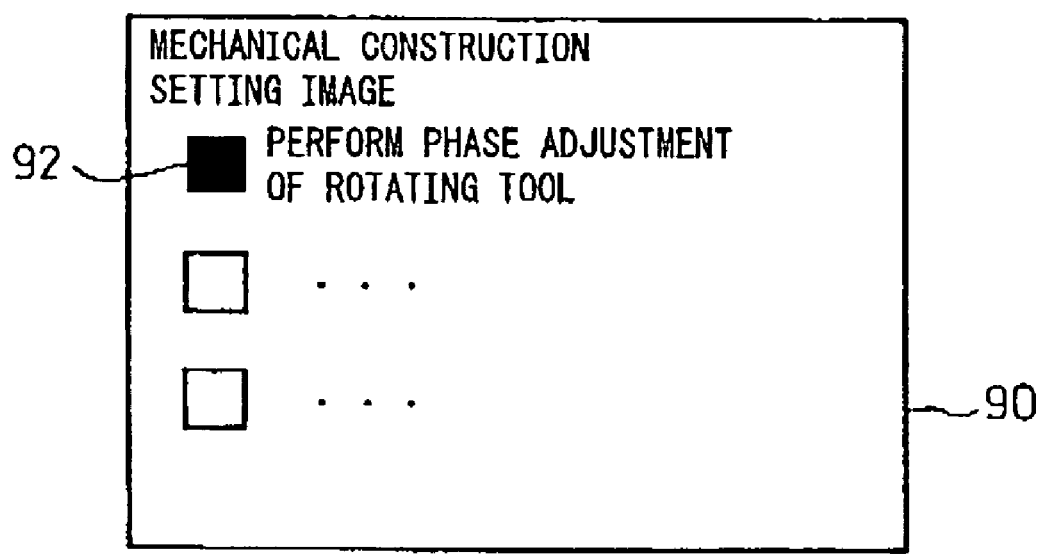
FIG. 8 is a view showing an example of a screen image displayed on a display section in the control device of FIG. 7.

The display section 74 can display a mechanical-configuration setting page or image 90, as shown, e.g., in FIG. 8, for permitting an operator to optionally instruct the addition or modification of the mechanical configuration of the NC lathe. Also, a designating space 92 can be provided in the mechanical configuration setting image 90, for allowing the operator to select and designate whether the phase adjusting operation of the rotating motion of a rotating tool is carried out. The operator can instruct, in the mechanical configuration setting image 90 displayed on the display unit of the display section 74 by using the designating space 92, whether the phase of the rotating motion of a rotating tool fitted to a certain tool-mount portion 24 of the turret 14 at an instant when the rotating tool is disposed at an indexed position by the turning indexing motion of the turret 14 is matched with a specified phase. In this connection, various images including the mechanical configuration setting image 90 are previously stored in RAM 80.

In the selectable operation storage area 86 of RAM 80, the rules of the tool selecting operation of the turret for each of the "less than one rotation control" and the "shortcut rotation control" as described above are previously stored. When it is instructed through the input section 72 to adjust the phase of the rotating motion of the rotating tool, CPU 76 reads out the rules of the tool selecting operation for the "less than one rotation control" stored in the selectable operation storage area 86, performs the operation as shown in, e.g., FIG. 6, and issues a command for the "less than one rotation control" to the drive control section 82 so as to make the control section control the cumulative sum of the turning indexing motion of the turret 14 in the same direction to be less than one rotation. On the other hand, when it is instructed through the input section 72 to not adjust the phase of the rotating motion of the rotating tool, CPU 76 reads out the rules of the tool selecting operation for the "shortcut rotation control" stored in the selectable operation storage area 86, and issues a command for the "shortcut rotation control" to the drive control section 82 so as to make the control section control the individual turning indexing motion of the turret 14 to be at most half a rotation in any turning direction.

As is apparent from the foregoing description, in accordance with the present invention, in a turret tool rest in which a rotating tool can be fitted to a certain tool-mount portion, it is possible to perform the tool selecting operation of the turret by suitably selecting either one of the operation in which the cumulative sum of a turning indexing motion is less than one rotation and the operation in which the individual turning indexing motion is equal to or less than half a rotation, in accordance with the contents of the machining program, such as the types of tools fitted to the turret or the provision of a secondary machining step after a cutting step using a rotating tool. Thus, according to the present invention, it is possible to avoid the complication of a machining program and to reduce a load on an operator, as well as to effectively prevent the unnecessary increase of a cycle time.

While some preferred embodiments according to the present invention has been described above, it will be understood that the invention is not restricted to these embodiments and that various changes and modifications may be made without departing from the disclosure of the claims.

The invention claimed is:

1. A method for controlling a tool selecting operation in a turret tool rest including a turret provided with a plurality of tool-mount portions at respective indexing angles in a circumferential direction, in which a rotating tool fitted to a certain tool-mount portion rotates in a passive manner in accordance with a turning indexing motion of said turret, said method comprising: selecting whether a phase of a rotating motion of said rotating tool, fitted to said tool-mount portion of said turret, is adjusted to be identical each time said rotating tool is disposed at an indexed position; causing said turret to perform a turning indexing motion, when it is selected that said phase of said rotating motion of said rotating tool is adjusted to be identical, in such a manner that a cumulative sum of said turning indexing motion of said turret in a same turning direction is less than one rotation; and causing said turret to perform a turning indexing motion, when it is selected that said phase of said rotating motion of said rotating tool is not adjusted to be identical, in such a manner that an individual turning indexing motion of said turret is at most half a rotation in any turning direction.

2. A method for controlling a tool selecting operation, as set forth in claim 1, wherein said plurality of tool-mount portions are respectively assigned tool numbers in ascending order along a certain turning direction; and wherein, in a case where said turret is caused to perform said turning indexing motion while ensuring said less than one rotation, a turning direction is determined by comparing a tool number of said tool-mount portion for a currently selected tool as being currently used with a tool number of said tool-mount portion for a next designated tool as to be subsequently used, among all of said tools fitted to the turret.

3. A method for controlling a tool selecting operation, as set forth in claim 1, wherein said rotating tool comprises a hob.

4. A method for controlling a tool selecting operation, as set forth in claim 1, wherein said rotating tool comprises a polygon cutter.

5. A control device for carrying out a method for controlling a tool selecting operation as set force in claim 1, said control device comprising: an input section for allowing an instruction regarding whether the phase of the rotating motion of said rotating tool is matched with a specified phase at an instant when said rotating tool fitted to said certain tool-mount portion of said turret is disposed at the indexed position by the turning indexing motion of said turret; a drive control section for controlling said turning indexing motion of said turret; and a processing section for causing said drive control section to control said turning indexing motion in such a manner that, when it is instructed through said input section that the phase of the rotating motion of said rotating tool is matched, the cumulative sum of the turning indexing motion of said turret in the same turning direction becomes less than one rotation, and for causing said drive control section to control said turning indexing motion in such a manner that, when it is instructed through said input section that the phase of the rotating motion of said rotating tool is not matched, the individual turning indexing motion of said turret is at most half a rotation in any turning direction.

* * * * *